US012780120B2

(12) United States Patent
Toda et al.

(10) Patent No.: US 12,780,120 B2
(45) Date of Patent: Nov. 3, 2026

(54) VEHICLE SEAT

(71) Applicant: TOYOTA BOSHOKU KABUSHIKI KAISHA, Aichi (JP)

(72) Inventors: Yuki Toda, Okazaki (JP); Fumito Ueda, Seto (JP)

(73) Assignee: TOYOTA BOSHOKU KABUSHIKI KAISHA, Aichi (JP)

(*) Notice: Subject to any disclaimer, the term of this patent is extended or adjusted under 35 U.S.C. 154(b) by 129 days.

(21) Appl. No.: 18/651,956

(22) Filed: May 1, 2024

(65) Prior Publication Data

US 2024/0399982 A1 Dec. 5, 2024

(30) Foreign Application Priority Data

May 31, 2023 (JP) ................................ 2023-089894

(51) Int. Cl.

*B60R 16/02* (2006.01)
*B60N 2/02* (2006.01)
*B60N 2/06* (2006.01)
*B60R 16/027* (2006.01)

(52) U.S. Cl.

CPC ...... *B60R 16/0215* (2013.01); *B60N 2/02258* (2023.08); *B60N 2/06* (2013.01); *B60R 16/027* (2013.01)

(58) Field of Classification Search

CPC ........................ B60R 16/0215; B60N 2/02258
See application file for complete search history.

(56) References Cited

U.S. PATENT DOCUMENTS

| | | | | |
|---|---|---|---|---|
| 6,105,920 A * | 8/2000 | Gauger | B60N 2/067 | 297/344.1 |
| 6,428,039 B1 * | 8/2002 | Pramler | G01G 19/4142 | 180/271 |
| 7,137,665 B2 * | 11/2006 | Osawa | B60N 2/0715 | 177/144 |
| 8,844,890 B2 * | 9/2014 | Endo | B60N 2/0025 | 248/424 |
| 8,998,324 B2 * | 4/2015 | Kitaguchi | B60N 2/0031 | 296/65.13 |
| 9,931,999 B2 * | 4/2018 | Line | B60N 2/4228 | |
| 11,634,093 B2 * | 4/2023 | Golen | B60N 2/5621 | 297/180.12 |
| 12,384,309 B2 * | 8/2025 | Ono | B60N 2/06 | |

FOREIGN PATENT DOCUMENTS

| | | |
|---|---|---|
| JP | 2005313662 A | 11/2005 |
| JP | 2018188060 A * | 11/2018 |
| JP | 2021109500 A * | 6/2021 |
| JP | 2021-109469 A | 8/2021 |
| JP | 2025146224 A * | 10/2025 |

OTHER PUBLICATIONS

Japanese Notice of Reasons for Refusal issued on Jul. 28, 2026 in the Japanese Patent Application No. 2023-089894 and its English translation.

* cited by examiner

*Primary Examiner* — Timothy J Brindley
(74) *Attorney, Agent, or Firm* — Greenblum & Bernstein, P.L.C.

(57) ABSTRACT

A vehicle seat includes a resin connector holder that supports a harness and a connector and to which the harness and the connector are fixed, the connector holder being fixed to a sliding device.

9 Claims, 12 Drawing Sheets

VEHICLE SEAT

CROSS-REFERENCE TO RELATED APPLICATIONS

This application claims the benefit of Japanese Patent Application No. 2023-089894 filed on May 31, 2023 with the Japan Patent Office, the entire disclosure of which is incorporated herein by reference.

BACKGROUND

The present disclosure relates to a vehicle seat mounted to a vehicle.

For example, in a vehicle seat disclosed in Japanese Unexamined Patent Application Publication No. 2021-109469, an ECU, such as an electronic controller, is mounted to a cushion frame via a bracket.

SUMMARY

A harness, such as a signal wire and a power supply line for supplying electric power, is coupled to an electrical device such as an ECU. However, Japanese Unexamined Patent Application Publication No. 2021-109469 does not disclose any specific wire routing structures of a harness coupled to an electrical device at all. In consideration of this fact, the present disclosure will disclose examples of a vehicle seat.

It is preferable that a vehicle seat mounted to a vehicle according to one aspect of the present disclosure includes at least one of the elements described below, for example.

The elements are: a first sliding device including a first fixed rail configured to be fixed to a vehicle and a first movable rail to which a seat main body is fixed, the first movable rail being slidable relative to the first fixed rail, and the first sliding device being situated on one end side of the seat main body in seat-width directions; a second sliding device including a second fixed rail configured to be fixed to the vehicle and a second movable rail to which the seat main body is fixed, the second movable rail being slidable relative to the second fixed rail, and the second sliding device being situated on an other end side of the seat main body in the seat-width directions; and a resin connector holder that supports a harness and a connector coupled to an electrical device and to which the harness and the connector are fixed, the connector holder being directly or indirectly fixed to the first movable rail and the second movable rail.

In this vehicle seat, the harness and the connector are thus held by the connector holder. Mounting of the harness and the connector is completed by mounting the connector holder, to which the harness and the connector are attached, to the two sliding devices.

The vehicle seat may be configured as below, for example.

The vehicle seat may include a plurality of fixing members disposed on the connector holder and configured to fix the connector holder to the first movable rail and the second movable rail; and a plurality of fixed members, to each of which corresponding one of the fixing members is mounted in a direction parallel to a sliding direction of the first movable rail and the second movable rail. When the fixing members are mounted to the fixed members respectively, it is desirable that a main fixing member, a main fixed member, sub fixing members, and sub fixed members are configured such that the sub fixing members and the sub fixed members come in contact with each other after the main fixing member and the main fixed member come in contact with each other.

The main fixing member is a fixing member that is situated closest to a front-end side among the fixing members. The front-end side is an advancing side of the connector holder in an assembling direction. The "sub fixing members" is a collective name for the fixing members other than the main fixing member. The main fixed member is a fixed member to which the main fixing member is mounted. The sub fixed members are fixed members to which the sub fixing members are mounted.

Accordingly, each of the fixing members is mounted to the corresponding one of the fixed members in the same direction. When mounting the connector holder, the sub fixing members are mounted to the sub fixed members in a state where positioning is achieved by the main fixing member and the main fixed member.

Thus, a worker who mounts the connector holder can mount the connector holder without considering the order of mounting steps. Consequently, it is possible to inhibit man hour from increasing, and at the same time, it is possible to prevent concentration of load on a particular one of the fixing members at the time of mounting the connector holder.

It is desirable that the vehicle seat further includes a bridge extending in the seat-width directions and coupling and bridging the first movable rail and the second movable rail. It is also desirable that the main fixed member is disposed on the bridge, and at least one of the sub fixed members is disposed on a bracket that is fixed to at least one of the first movable rail or the second movable rail.

The bracket includes a wall-shaped restriction member that restricts displacement of the connector holder over a given dimension in the seat-width directions. A portion of the connector holder facing the restriction member includes a wall-shaped opposing wall that is slidably contactable with the restriction member. It is desirable that a dimension of a portion of the opposing wall parallel to the assembling direction is greater than a dimension of a portion of the restriction member parallel to the assembling direction.

It is desirable that the vehicle seat further includes a harness clamp that holds the harness or the connector. It is also desirable that an electric motor is mounted to the bridge, and a mounting part of the harness clamp is disposed on the bridge.

If the mounting part of the harness clamp is disposed on the connector holder, the electric motor and the harness clamp may interfere with each other when mounting the connector holder. In contrast, in the aforementioned configuration, the electric motor and the harness clamp do not interfere with each other when mounting the connector holder.

It is desirable that the main fixed member includes a first guiding protrusion that protrudes towards a receding side of the connector holder in the assembling direction; a second guiding protrusion that protrudes towards the receding side of the connector holder in the assembling direction, the second guiding protrusion being disposed at a position deviated from the first guiding protrusion in the seat-width directions; and an elastically displaceable locking member that is disposed between the first guiding protrusion and the second guiding protrusion and is locked to the main fixing member. It is also desirable that the main fixing member includes a locked member to which the locking member is locked; a first guide that is slidably contactable with the first guiding protrusion in up-down directions and one direction of the seat-width directions; and a second guide that is slidably contactable with the second guiding protrusion in the up-down directions and an other direction of the seat-width directions.

Accordingly, when the main fixing member is mounted to the main fixed member, positioning of the seat-width directions and the up-down directions is achieved.

It is desirable that at least one of the sub fixed members is disposed on the bridge. It is also desirable that the fixing member mounted to the sub fixed member disposed on the bridge is mounted to the sub fixed member to hold the sub fixed member from the up-down directions.

Accordingly, the sub fixing member is mounted to the sub fixed member in a state where the main fixing member is positioned with respect to the main fixed member.

It is desirable that the fixing member that is mounted to the sub fixed member disposed on the bracket is mounted to the sub fixed member to hold the sub fixed member from the up-down directions.

Accordingly, the sub fixing member is mounted to the sub fixed member in a state where the main fixing member is positioned with respect to the main fixed member.

BRIEF DESCRIPTION OF THE DRAWINGS

Example embodiments of the present disclosure will be described hereinafter with reference to the accompanying drawings, in which.

DETAILED DESCRIPTION OF EXEMPLARY EMBODIMENTS

Figure 1:
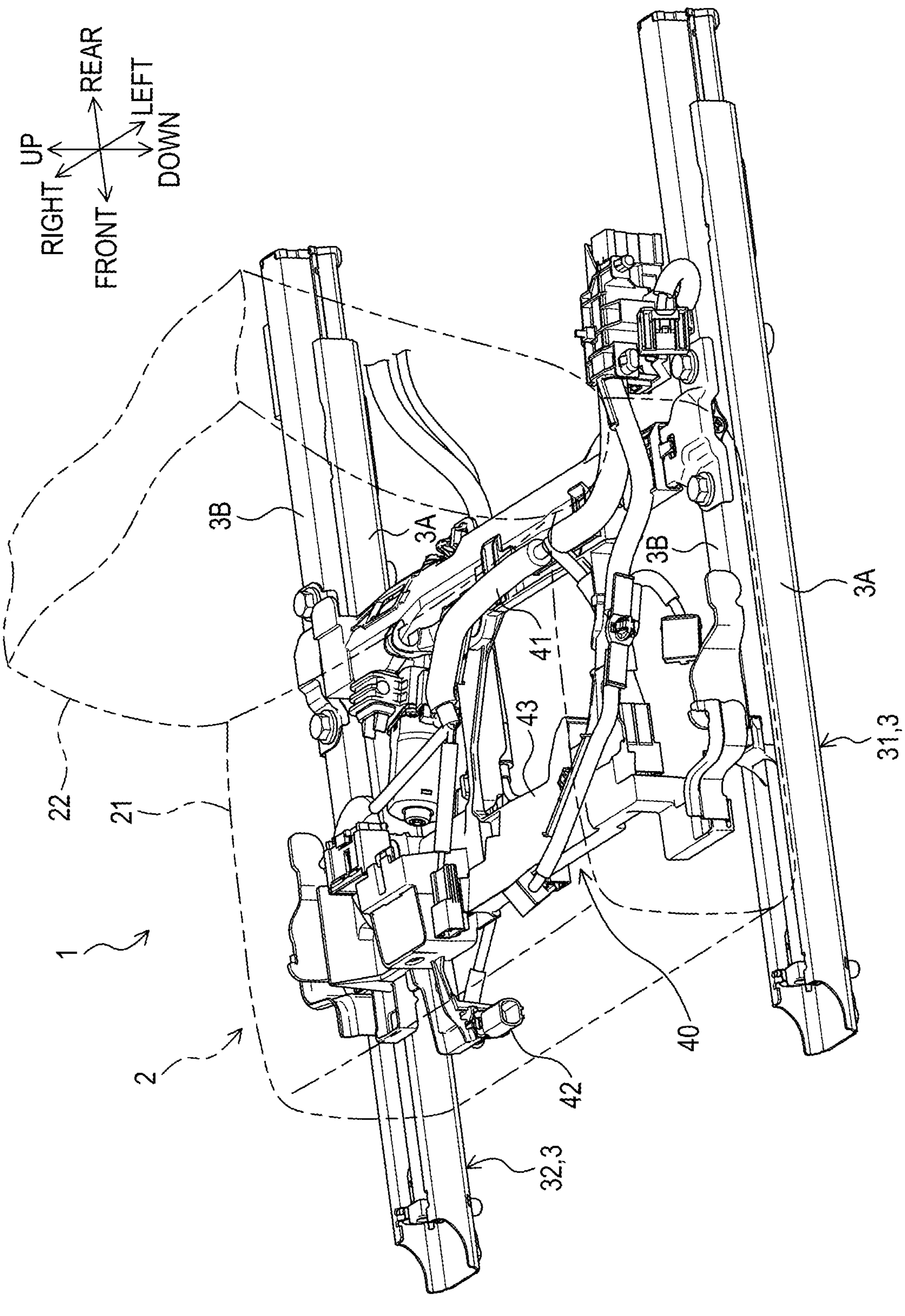
FIG. 1 is a diagram showing a vehicle seat according to a first embodiment.

Following embodiments of the invention represent examples of embodiments that fall within the technical scope of the present disclosure. In other words, matters to specify the invention or the like recited in the claims are not limited to any specific configuration, structure, or the like described in the following embodiments.

The present embodiments show examples where a vehicle seat of the present disclosure is applied to a seat mounted to a vehicle such as a car (hereinafter referred to as "vehicle seat"). Arrows for indicating directions, oblique lines, or the like in each drawing are provided to facilitate understanding of mutual relations between the drawings, the shapes of members or portions, or the like.

Therefore, orientation of the vehicle seat is not limited to how the vehicle seat is oriented in each drawing. The directions in each drawing are provided to show the orientation of the vehicle seat of the present embodiments when it is mounted to a car. A drawing with the oblique lines does not necessarily represent a cross-sectional view.

With respect to a member or a portion explained at least with a reference numeral, at least one of such a member or a portion is disposed unless it is described using a term such as "only one of". In other words, unless it is described using a term such as "only one of", two or more of such a member or a portion may be disposed. The vehicle seat of the present disclosure includes at least one of an element, such as a member or a portion explained at least with a reference numeral, or a structural component shown in the drawings.

First Embodiment

<1. Outline of Vehicle Seat>

As shown in FIG. 1, a vehicle seat 1 includes at least a seat main body 2, a first sliding device 31, a second sliding device 32, and a holder assembly 40. The seat main body 2 includes a seat cushion 21, a seatback 22, and the like. The seat cushion 21 is a portion for supporting the buttocks of an occupant. The seatback 22 is a portion for supporting the back of the occupant.

The first sliding device 31 and the second sliding device 32 are mechanisms that slidably support the seat main body 2. The first sliding device 31 is situated on one end side of the seat in seat-width directions (left-end side in FIG. 1) and supports the seat main body 2.

The second sliding device 32 is situated on the other end side of the seat in the seat-width directions (right-end side in FIG. 1) and supports the seat main body 2. The first sliding device 31 and the second sliding device 32 have the same structure. Hereinafter, the first sliding device 31 and the second sliding device 32 are collectively referred to as a sliding device 3.

The sliding device 3 includes at least fixed rails 3A and movable rails 3B. The fixed rails 3A are rail members that are directly or indirectly fixed to a vehicle. The movable rails 3B are members, to which the seat main body 2 is fixed, and that are slidable relative to the fixed rails 3A.

Figure 2:
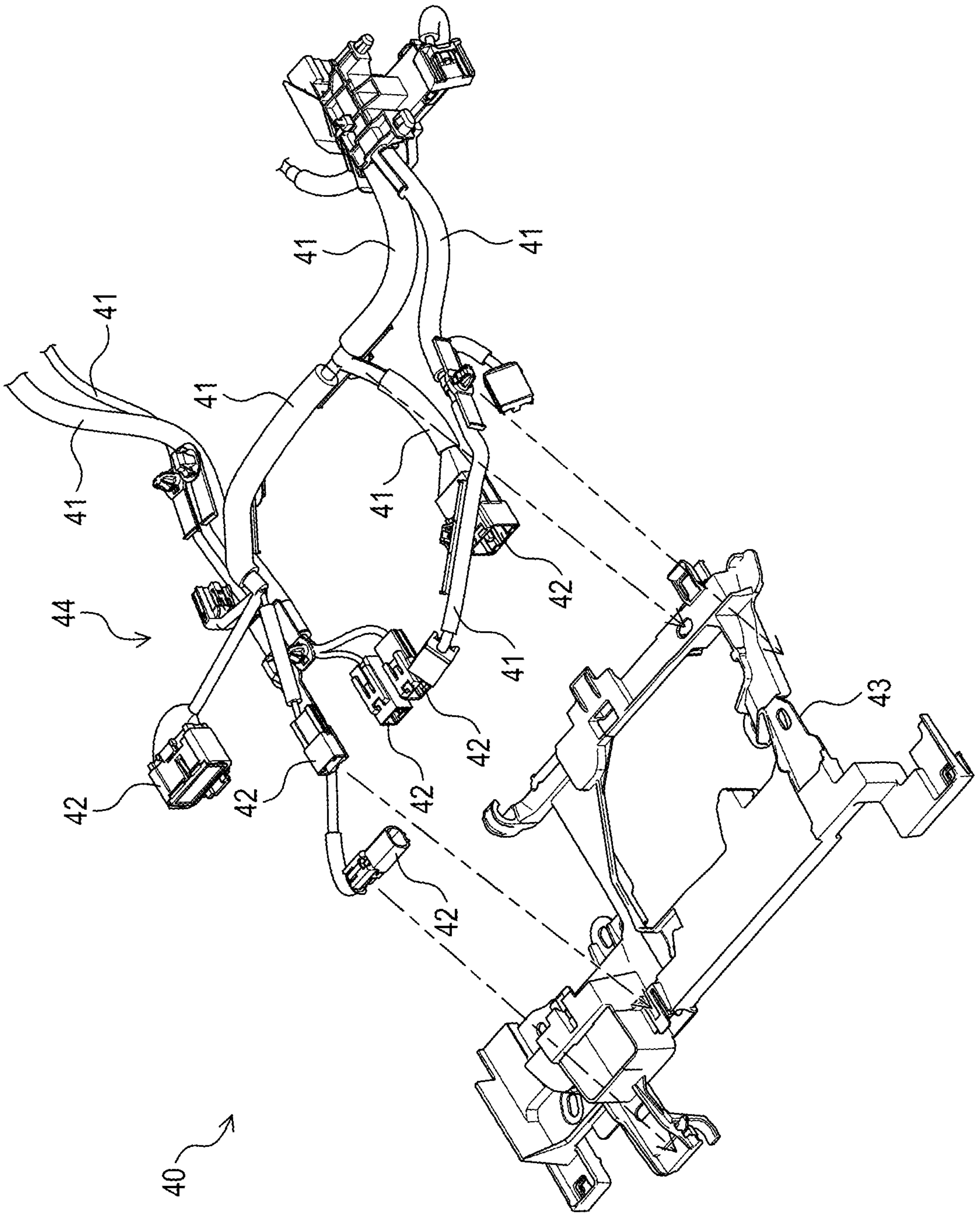
FIG. 2 is an exploded view of a holder assembly according to the first embodiment.

As shown in FIG. 2, the holder assembly 40 is a sub assembly including at least one or more harnesses 41, one or more connectors 42, and a connector holder 43.

The harnesses 41 are electric wires coupled to one or more electrical devices (not illustrated). More specifically, the harnesses 41 are power supply lines that supply electric power, signal wires that transmit signals, or the like. The connectors 42 are connections connecting a harness to a harness, or connections connecting a harness to an electrical device.

Each of the connectors 42 is disposed at an end of one of the harnesses 41. Hereinafter, one or more harnesses 41 and one or more connectors 42 are collectively referred to as a harness assembly 44.

The connector holder 43 is a resin member that supports the harness assembly 44 and to which the harnesses 41 and the connectors 42 are fixed. The connector holder 43 is directly or indirectly fixed to the two movable rails 3B so as to bridge the two movable rails 3B (see FIG. 1).

Figure 3:
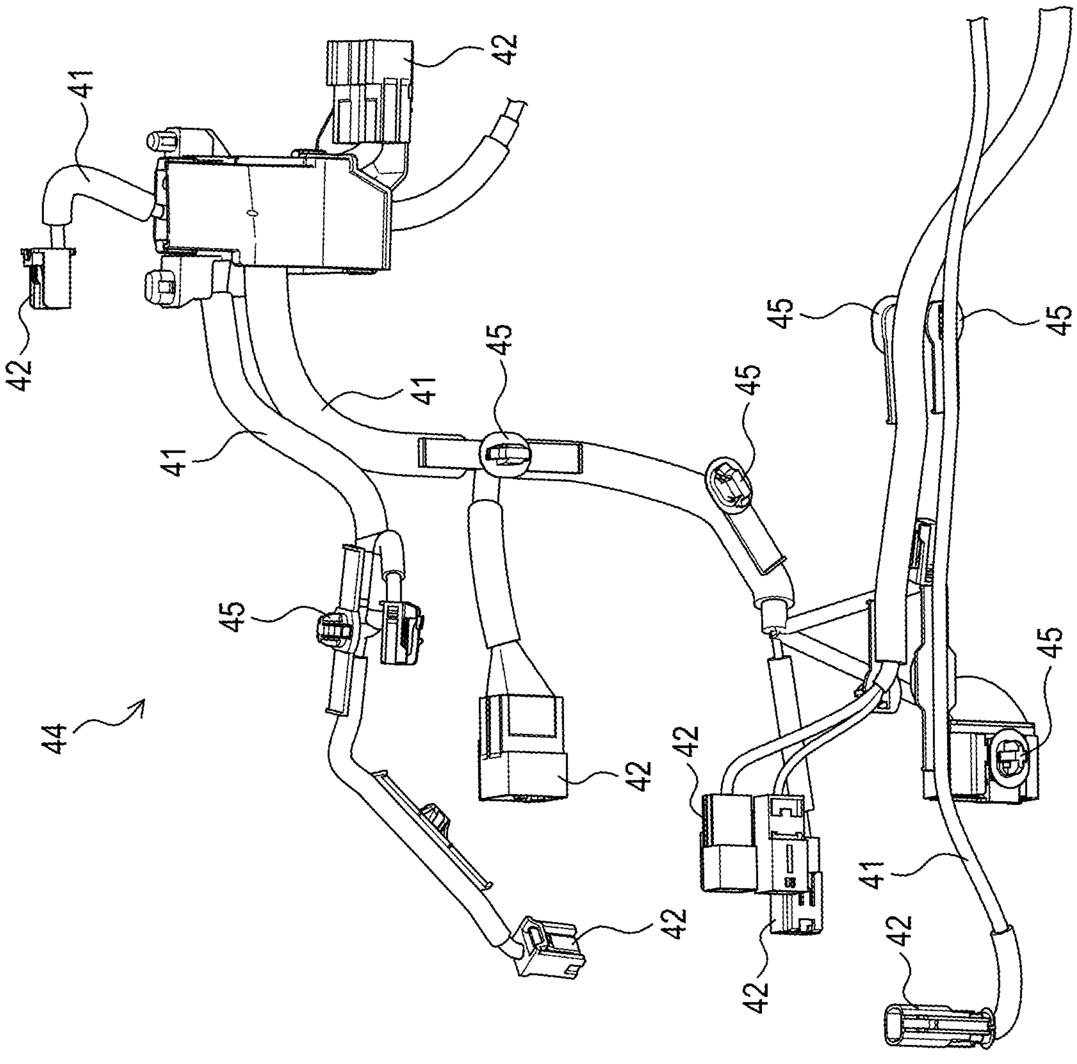
FIG. 3 is a diagram showing a harness assembly according to the first embodiment.

As shown in FIG. 3, the harness assembly 44 includes at least one harness clamp 45 (two or more harness clamps 45 in the present embodiment). Each harness clamp 45 is a member for holding the harness assembly 44.

Figure 4:
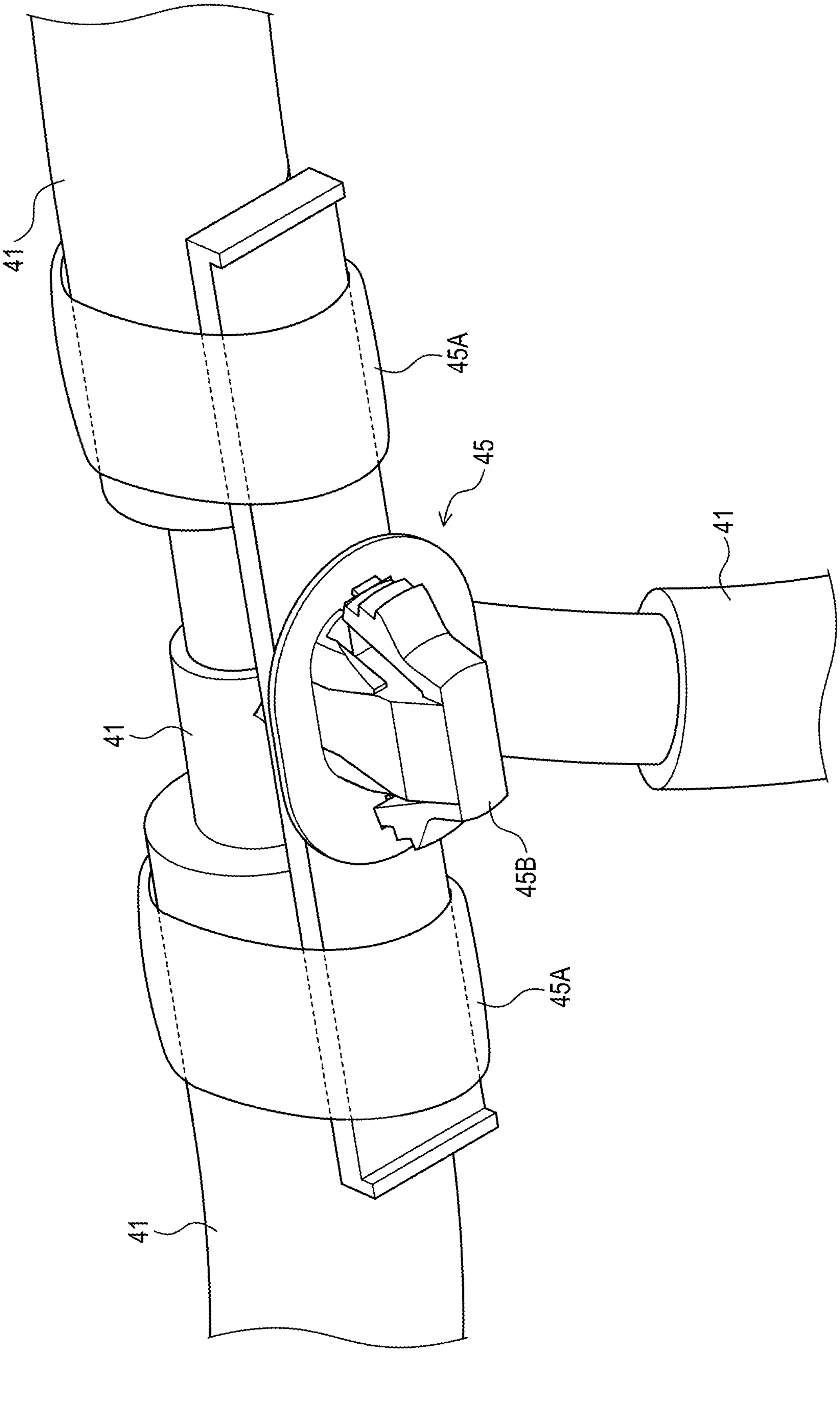
FIG. 4 is a diagram showing a harness clamp according to the first embodiment.

More specifically, as shown in FIG. 4, each harness clamp 45 according to the present embodiment is fixed to one or more of the harnesses 41 with a tape 45A. The harness clamp 45 includes a locking member 45B. The locking member 45B is a portion that is fixed to the connector holder 43 by locking.

A locking member (not illustrated) is also disposed on at least one of the connectors 42. This locking member is also fixed to a locked member (not illustrated) disposed on the connector holder 43 by locking.

Accordingly, the harness assembly 44 is held by the connector holder 43 to form the holder assembly 40. Thus, an assembly worker (hereinafter referred to as "worker") assembles the holder assembly 40 and then mounts the holder assembly 40 on the sliding device 3 (see FIG. 5).

Hereinafter, the direction of mounting of the holder assembly 40 at the time of the aforementioned assembling operation (the direction of the arrow in FIG. 5) is referred to as an "assembling direction". The assembling direction in the present embodiment is parallel to a sliding direction of the movable rails 3B and is a direction from the front side of the seat towards the rear side of the seat.

<2. Details of Connector Holder>

Figure 6:
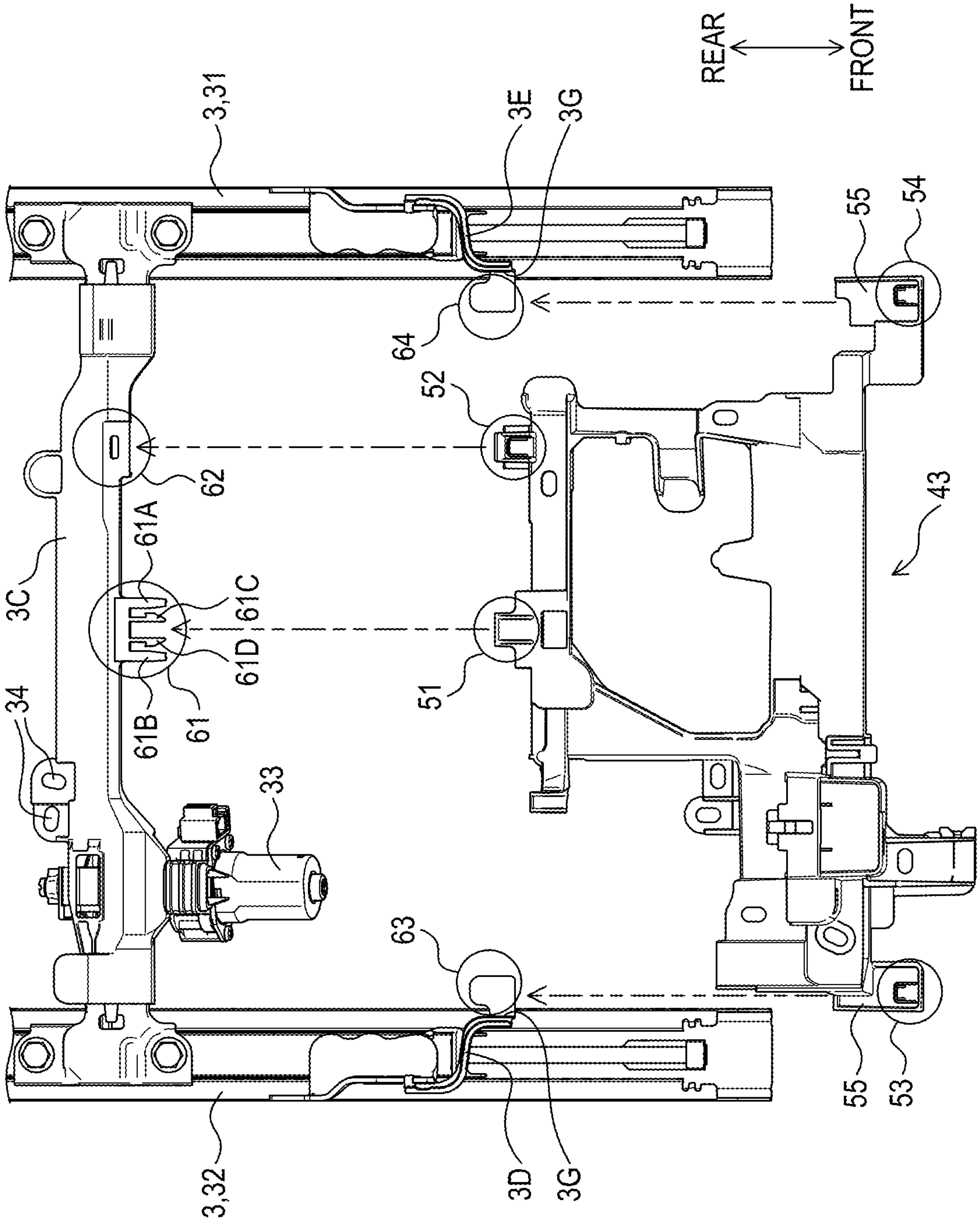
FIG. 6 is a diagram showing the holder assembly and sliding devices according to the first embodiment.

As shown in FIG. 6, the connector holder 43 includes a plurality of, or specifically, at least three (four in the present embodiment) fixing members 51, 52, 53, 54. These fixing members 51 to 54 are portions that directly or indirectly fix the connector holder 43 to the two movable rails 3B.

Meanwhile, four fixed members 61, 62, 63, 64, to which the fixing members 51 to 54 are mounted respectively, are disposed on a side of the two movable rails 3B. Each of the four fixing members 51 to 54 is mounted to corresponding one of these fixed members 61 to 64 (see FIG. 7).

In the present embodiment, "the side of the two movable rails 3B" includes at least the two movable rails 3B and a bridge 3C. The bridge 3C is a member that extends in the seat-width directions and couples the two movable rails 3B so as to bridge the two movable rails 3B (see FIG. 6).

Figure 5:
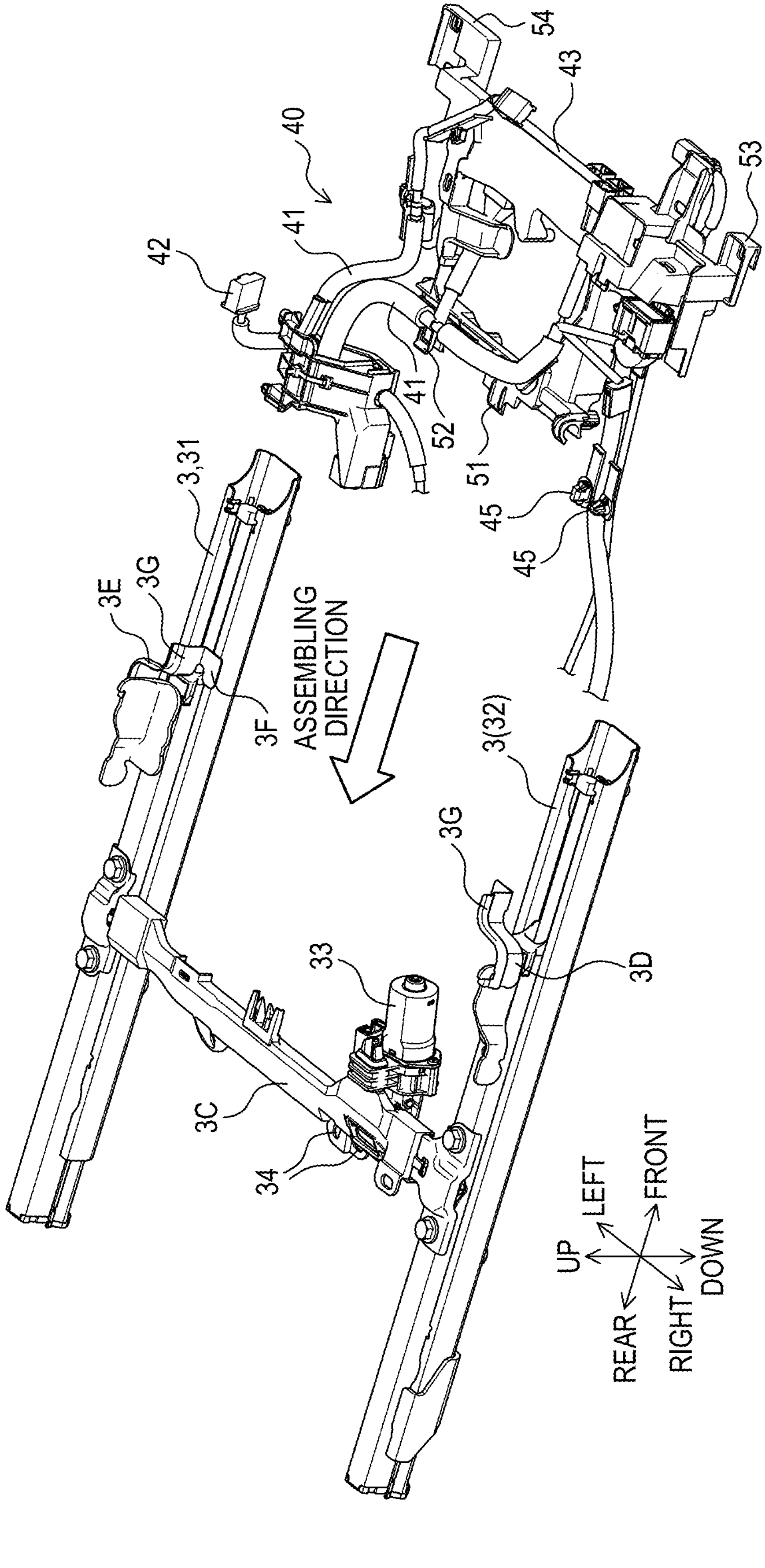
FIG. 5 is a diagram showing a method of mounting the holder assembly according to the first embodiment.

As shown in FIG. 5, an electric motor 33 is mounted on the bridge 3C. The electric motor 33 generates a driving force to operate the first sliding device 31 and the second sliding device 32.

At least one (two in FIG. 5) locked member 34 is disposed near the electric motor 33 on the bridge 3C. The locked member 34 is a mounting part where the locking member 45B of the harness clamp 45 is locked. For this purpose, the bridge 3C according to the present embodiment is made of resin.

Hereinafter, among the fixing members 51 to 54, the fixing member situated on an advancing side (hereinafter also referred to as "front-end side") of the assembling direction as shown in FIG. 6 is referred to as a "main fixing member". In the present embodiment, the fixing member 51 corresponds to the main fixing member.

Among the four fixing members 51 to 54, the fixing members 52 to 54 other than the main fixing member 51 are collectively referred to as "sub fixing members". The fixed member 61 to which the main fixing member 51 is mounted is referred to as a "main fixed member". The fixed members 62 to 64 to which the sub fixing members 52 to 54 are mounted are referred to as "sub fixed members".

In addition, the sub fixing member 52 is referred to as a "first sub fixing member"; the sub fixing member 53 is referred to as a "second sub fixing member"; and the sub fixing member 54 is referred to as a "third sub fixing member". Correspondingly, the sub fixed member 62 is referred to as a "first sub fixed member"; the sub fixed member 63 is referred to as a "second sub fixed member"; and the sub fixed member 64 is referred to as a "third sub fixed member".

In the present embodiment, the connector holder 43 and the fixed members 61 to 64 are configured such that the sub fixing members 52 to 54 come in contact with the sub fixed members 62 to 64 after the main fixing member 51 comes in contact with the main fixed member 61 when the holder assembly 40 is mounted on the side of the two movable rails 3B.

In other words, in the present embodiment, the main fixed member 61 is disposed on the bridge 3C. The first sub fixed member 62 is disposed on the bridge 3C at a position deviated from the main fixed member 61 in the seat-width directions.

The second sub fixed member 63 and the third sub fixed member 64 are disposed on the movable rails 3B via brackets 3D, 3E respectively on a receding side of the assembling direction (on a front side of the seat in the present embodiment) relative to the bridge 3C.

Figure 8:
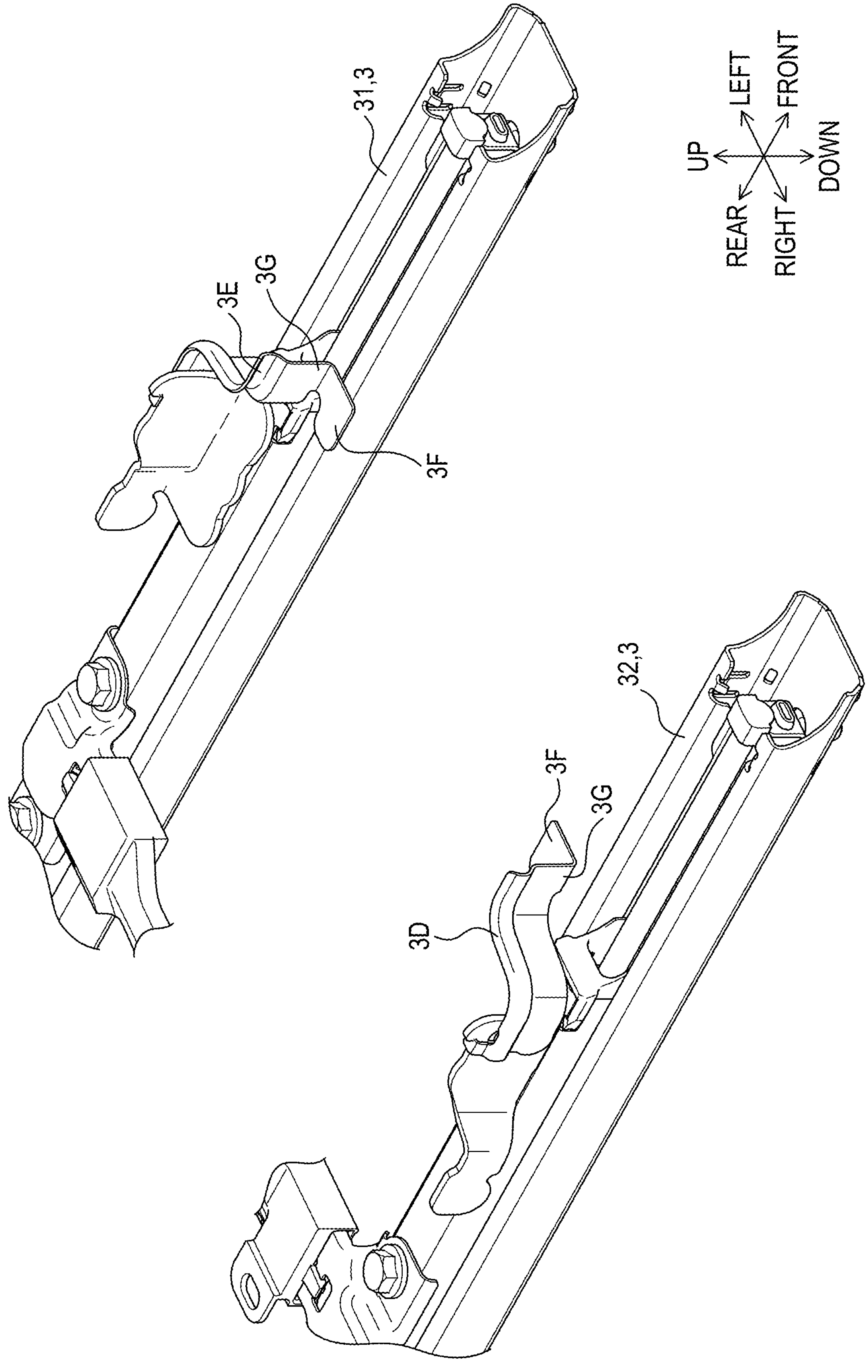
FIG. 8 is a diagram showing brackets and the like according to the first embodiment.

As shown in FIG. 8, the bracket 3D and the bracket 3E are approximately symmetric in shape. More specifically, each of the brackets 3D, 3E includes at least a horizontal part 3F and a restriction member 3G. The horizontal parts 3F are horizontal plate-shaped portions that form the sub fixed members 63, 64. Each of the restriction members 3G is a wall-shaped portion that restricts displacement of the connector holder 43 over a given dimension in the seat-width directions. More specifically, the restriction member 3G on the right side of FIG. 8 restricts the displacement of the connector holder 43 to the right.

The restriction member 3G on the left side of FIG. 8 restricts the displacement of the connector holder 43 to the left. Thus, the displacement of the connector holder 43 over the given dimension is restricted in both directions along the seat-width directions.

Figure 7:
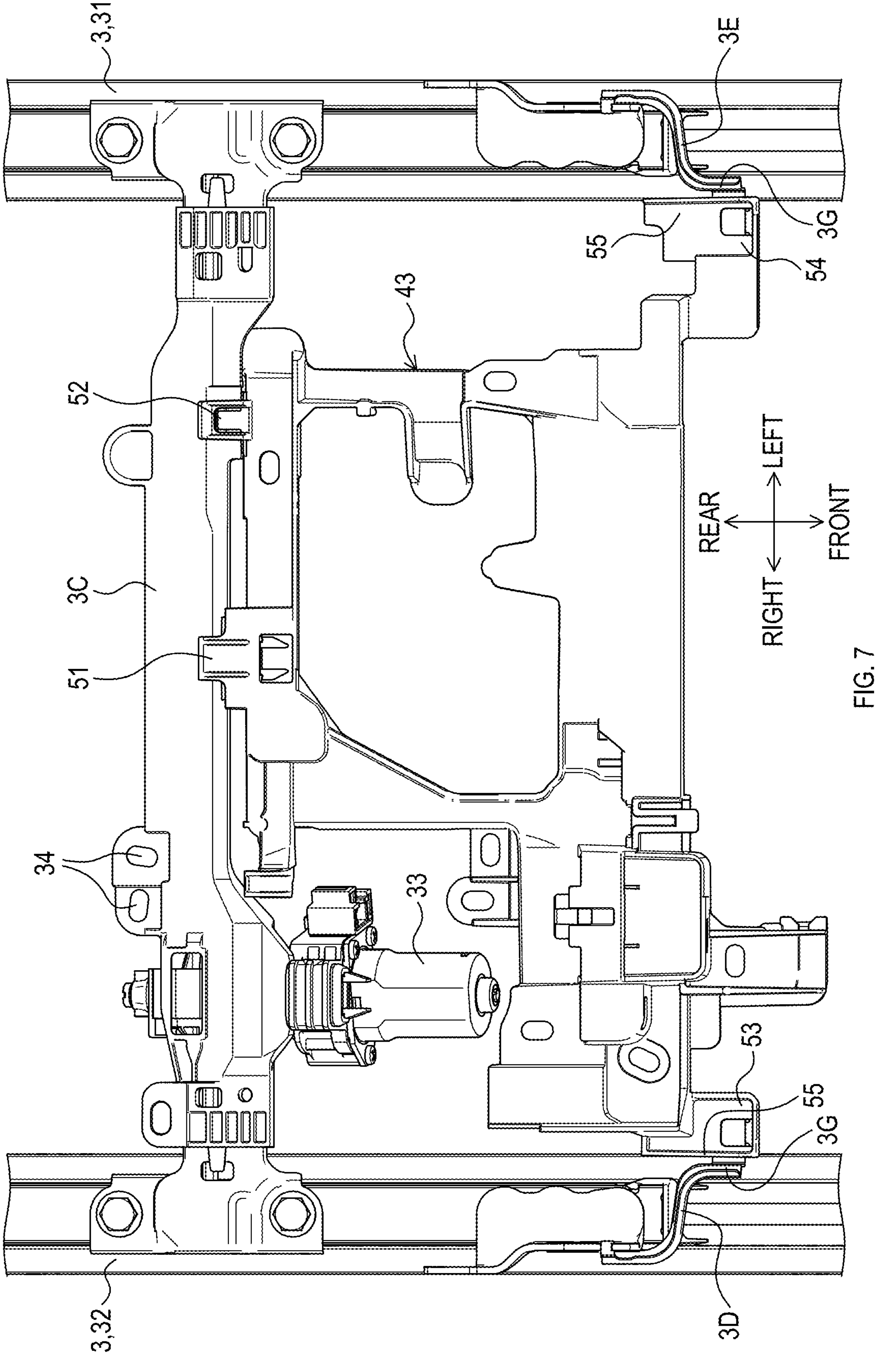
FIG. 7 is a diagram showing the holder assembly and the sliding devices according to the first embodiment.

Portions of the connector holder 43 facing the restriction members 3G each include an opposing wall 55 (see FIG. 7). These opposing walls 55 are wall-shaped portions that are slidably contactable with the opposing restriction members 3G.

Figure 9:
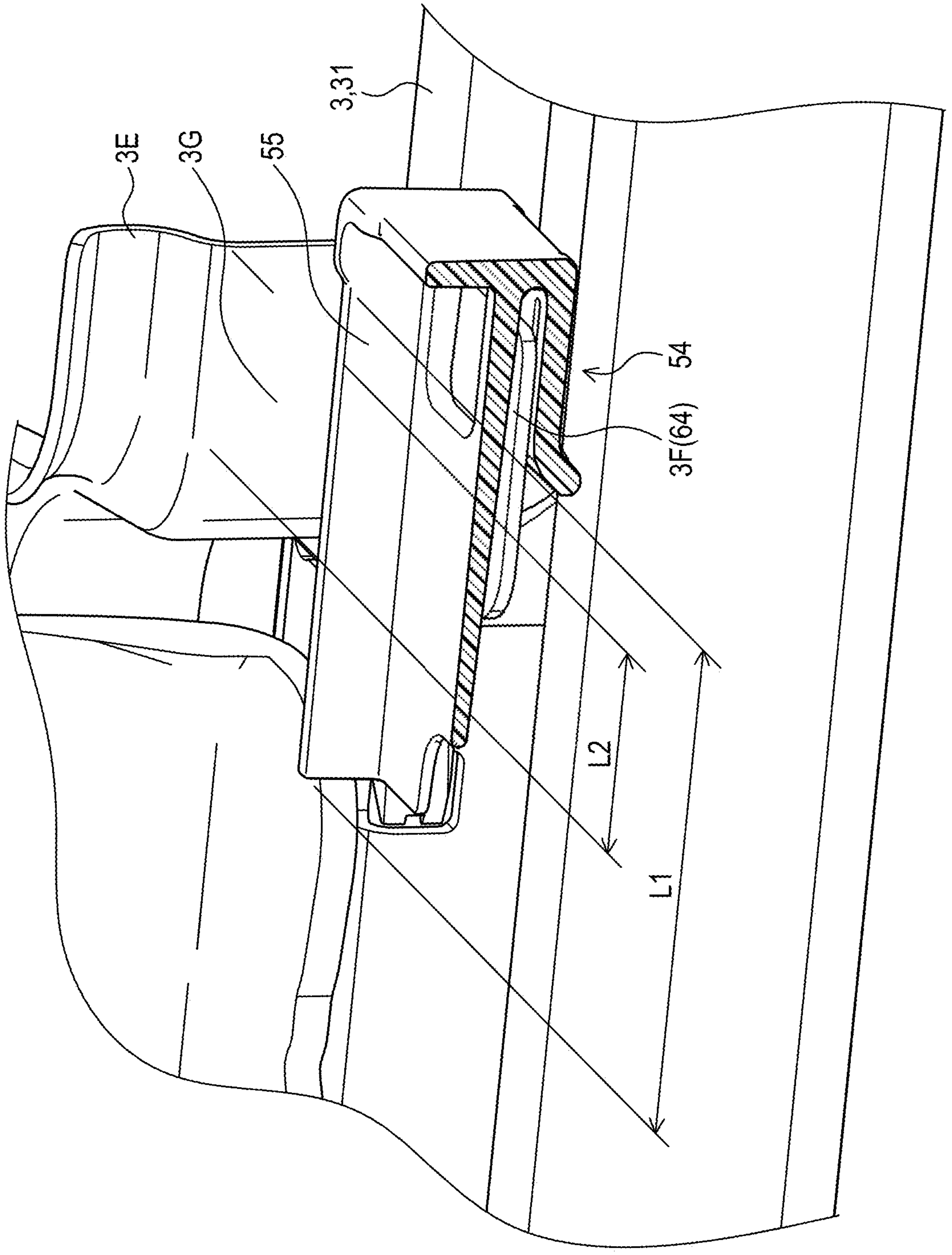
FIG. 9 is a diagram showing a sub fixing member and a sub fixed member according to the first embodiment.

A dimension of a portion of each of the opposing walls 55 parallel to the assembling direction, in other words, a dimension L1 of each of the opposing walls 55 in seat front-rear directions as shown in FIG. 9, is greater than a dimension L2 of a portion of the restriction member 3G parallel to the assembling direction.

More specifically, the dimension L1 is made greater than the dimension L2 so that each of the restriction members 3G faces the corresponding opposing wall 55 from the moment when the main fixing member 51 comes in contact with the main fixed member 61 until the mounting of the main fixing member 51 to the main fixed member 61 and the mounting of the sub fixing members 52 to 54 to the sub fixed members 62 to 64 are completed.

<2.1 Details of Fixing Members and Fixed Members>

<Main Fixed Member>

Figure 10:
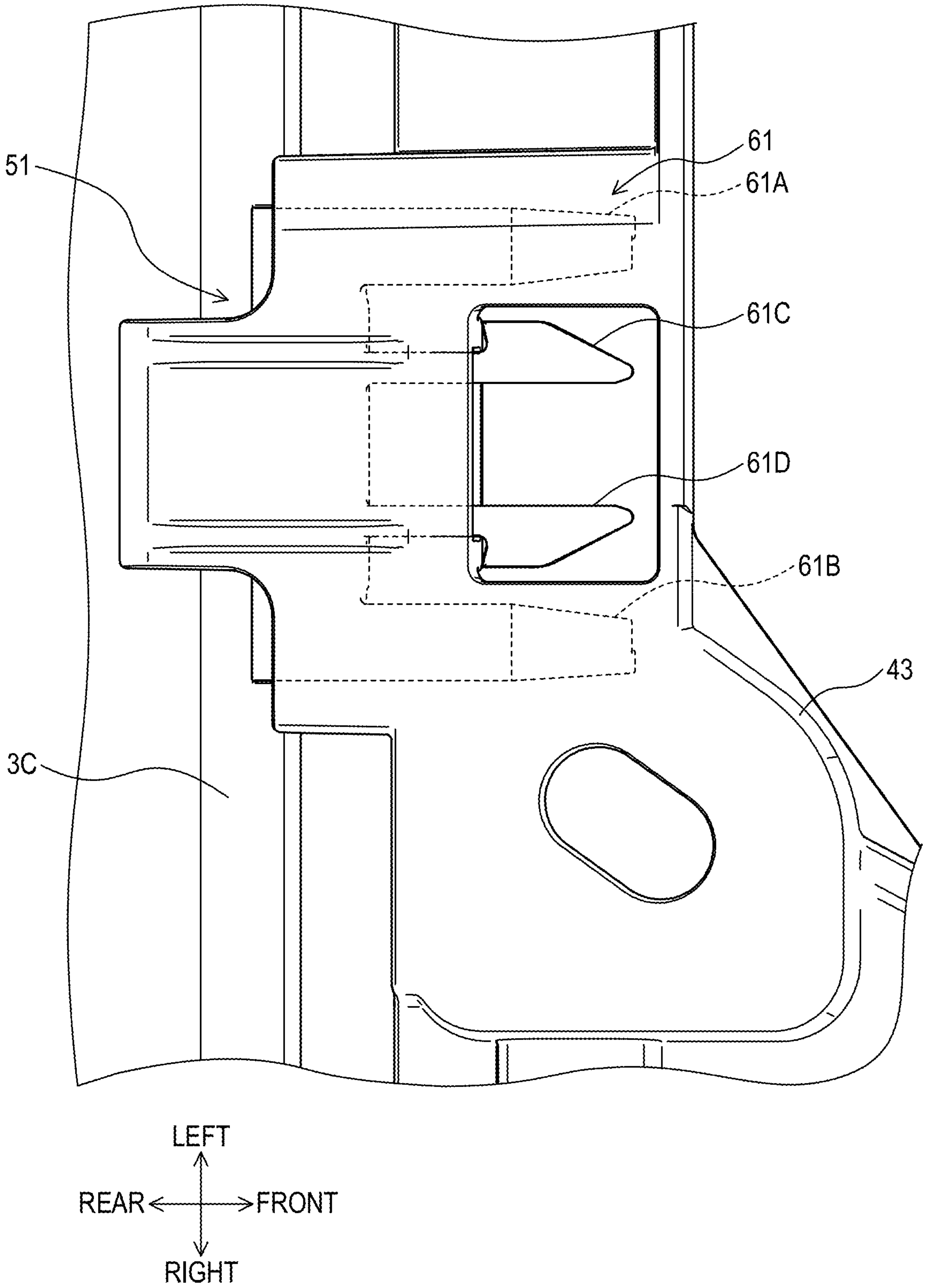
FIG. 10 is a diagram showing a main fixing member and a main fixed member according to the first embodiment.

As shown in FIG. 10, the main fixed member 61 includes at least a first guiding protrusion 61A, a second guiding protrusion 61B, and a locking member (two locking members 61C, 61D in the present embodiment).

The first guiding protrusion 61A and the second guiding protrusion 61B are parts that protrude towards a receding side of the assembling direction (the front side of the seat in FIG. 10) of the connector holder 43. The second guiding protrusion 61B is disposed at a position deviated from the first guiding protrusion 61A in the seat-width directions.

The locking members 61C, 61D are disposed between the first guiding protrusion 61A and the second guiding protrusion 61B. The locking members 61C, 61D are parts that are locked to the main fixing member 51 by being displaced elastically.

More specifically, each of the locking members 61C, 61D is a part formed to have a hook for snap-fitting. The first guiding protrusion 61A, the second guiding protrusion 61B, and the locking members 61C, 61D are integrally molded of resin with the bridge 3C in one piece.

<Main Fixing Member>

Figure 11:
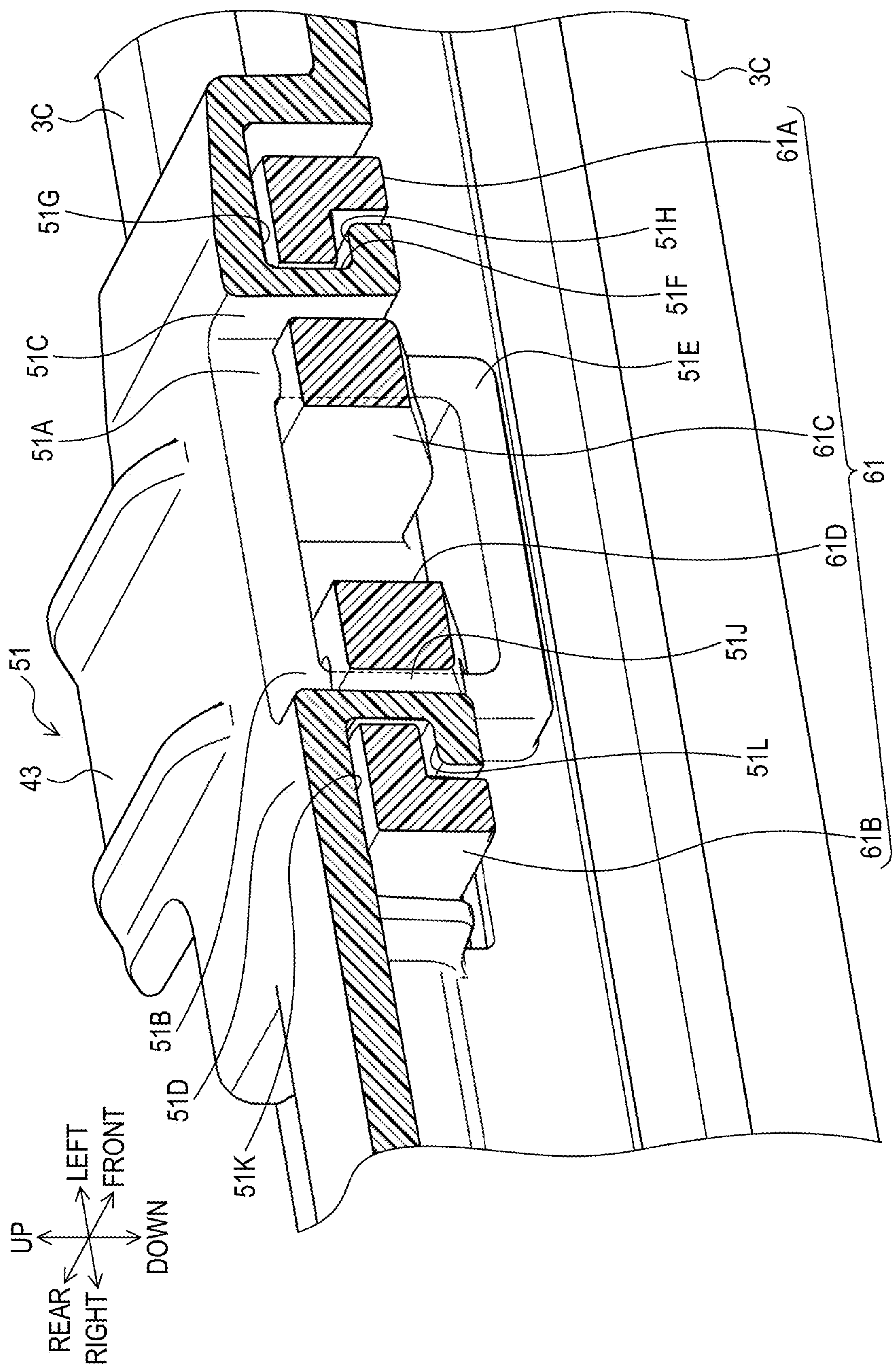
FIG. 11 is a diagram showing the main fixing member and the main fixed member according to the first embodiment; and, FIG. 12 is a diagram showing a sub fixing member and a sub fixed member according to the first embodiment.

As shown in FIG. 11, the main fixing member 51 includes at least a locked member (two locked members 51A, 51B in the present embodiment), a first guide 51C, and a second guide 51D.

Each of the locked members 51A, 51B is a part to which a corresponding one of the locking members 61C, 61D is locked. Those two locked members 51A, 51B of the present embodiment form one end-side frame and the other end-side frame of a rectangular frame 51E in a horizontal direction.

The first guide 51C is a part that forms a wall surface that is slidably contactable with the first guiding protrusion 61A in up-down directions and one direction of the seat-width directions. Specifically, the first guide 51C includes at least walls 51F, 51G, and 51H.

The wall 51F is a side part of the first guide 51C facing the first guiding protrusion 61A from the side of the locking member 61C. The wall 51G is a ceiling part of the first guide 51C facing the first guiding protrusion 61A from above. The wall 51H is a bottom part of the first guide 51C facing the first guiding protrusion 61A from below.

The second guide 51D is a part forming a wall surface that is slidably contactable with the second guiding protrusion 61B in the up-down directions and the other direction of the seat-width directions. Specifically, the second guide 51D includes at least walls 51J, 51K, and 51L.

The wall 51J is a side part of the second guide 51D facing the second guiding protrusion 61B from the side of the locking member 61D. The wall 51K is a ceiling part of the second guide 51D facing the second guiding protrusion 61B from above. The wall 51L is a bottom part of the second guide 51D facing the second guiding protrusion 61B from below.

Accordingly, (1) engagement of the locking members 61C, 61D with the locked members 51A, 51B restricts the displacement of the connector holder 43 in the assembling direction; and (2) the first guiding protrusion 61A, the second guiding protrusion 61B, the first guide 51C, and the second guide 51D restrict displacement of the connector holder 43 in the up-down directions and the seat-width directions.

<First Sub Fixing Member and First Sub Fixed Member>

Figure 12:
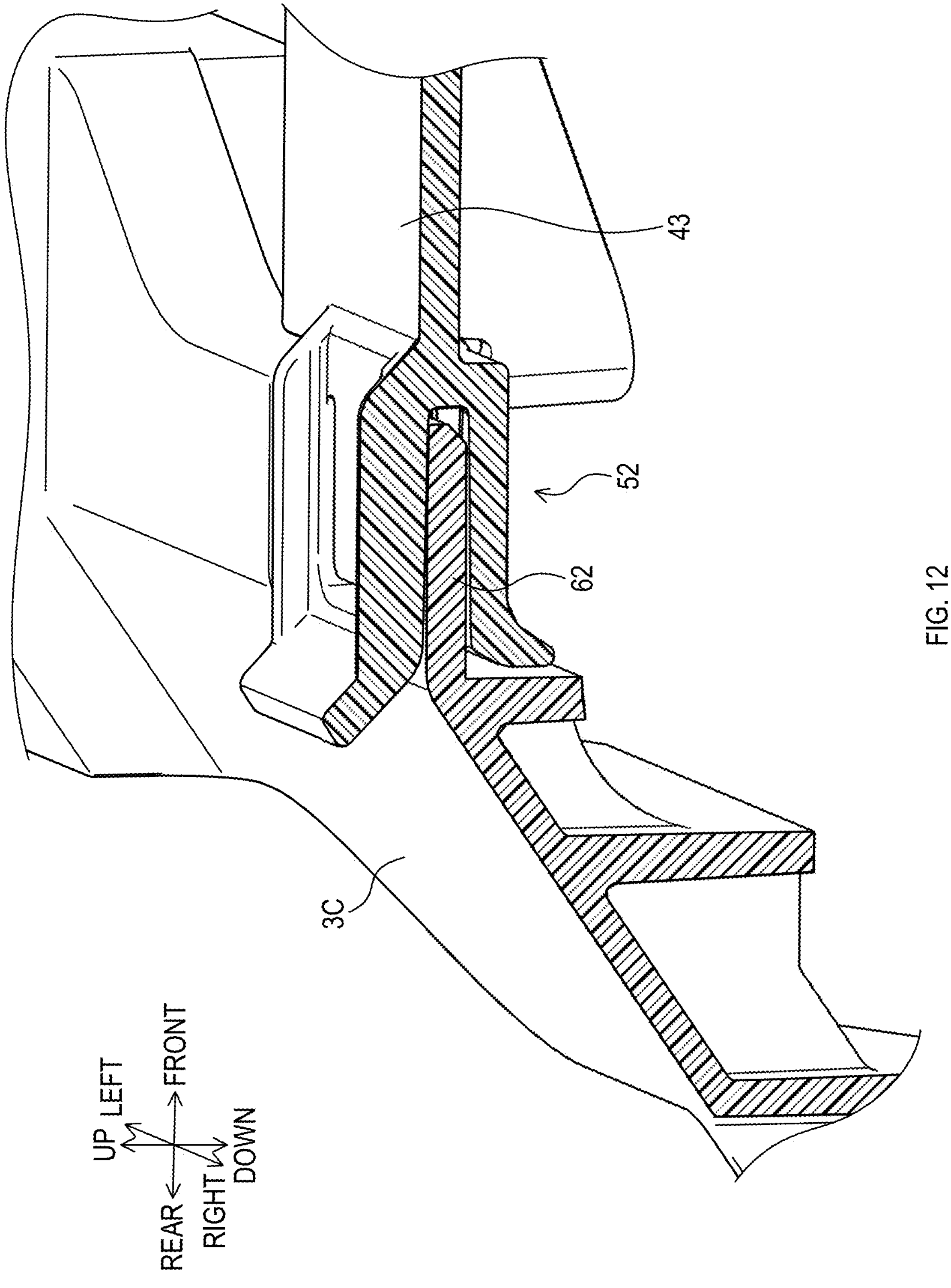

As shown in FIG. 12, the first sub fixed member 52 is mounted to the first sub fixing member 62 to hold the first sub fixing member 62 from the up-down directions.

<Second Sub Fixing Member, Third Sub Fixing Member, Second Sub Fixed Member, and Third Sub Fixed Member>

As shown in FIG. 9, for example, the second sub fixing member 53 and the third sub fixing member 54 are respectively mounted to the sub fixed member 63 and the sub fixed member 64 to hold the horizontal parts 3F, which form the sub fixed members 63 and 64, from the up-down directions.

<3. Method of Mounting Connector Holder (see FIG. 5)>

A worker who assembles the connector holder 43 to the sliding device 3 follows the procedure described below.

First, the worker mounts the harnesses 41 and the connectors 42 to the connector holder 43 to assemble the holder assembly 40 and also mounts the bridge 3C and the electric motor 33 to the sliding device 3. Hereinafter, the sliding device 3 having the bridge 3C and the electric motor 33 mounted thereto will be simply referred to as "the sliding device 3".

Then, the worker mounts the holder assembly 40 to the sliding device 3 such that the harness clamps 45 shown in FIG. 5 are situated on the lower side of the bridge 3C. It is because the harness clamps 45 shown in FIG. 5 are configured to be mounted to the locked members 34 from the lower side of the locked members 34.

More specifically, the worker mounts the holder assembly 40 to the sliding device 3 with the holder assembly 40 being slanted such that the main fixing member 51 and the first sub fixing member 52 are situated lower than the second sub fixing member 53 and the third sub fixing member 54.

At this point, the worker assembles the connector holder 43, or the holder assembly 40, to the sliding device 3 such that the sub fixing members 52 to 54 come in contact with the sub fixed members 62 to 64 after the main fixing member 51 comes in contact with the main fixed member 61.

The worker brings the holder assembly 40 to an approximately horizontal orientation when the main fixing member 51 comes in contact with the main fixed member 61 or when the assembly proceeds slightly further after the moment of contact in order to enable each of the second sub fixing member 53 and the third sub fixing member 54 to hold the horizontal part 3F from the up-down directions.

<4. Features of Vehicle Seat of Present Embodiment>

The vehicle seat 1 according to the present embodiment includes the resin connector holder 43 that supports the harnesses 41 and the connectors 42 and to which the harnesses 41 and the connectors 42 are fixed, the connector holder 43 being fixed to the sliding device 3.

Accordingly, in the vehicle seat 1, the harnesses 41 and the connectors 42 are held by the connector holder 43. Thus, mounting of the harnesses 41 and the connectors 42 is completed by mounting the connector holder 43, to which the harnesses 41 and the connectors 42 are mounted, to the two sliding devices 31, 32.

The vehicle seat 1 is configured such that, when the fixing members 51 to 54 are respectively mounted to the fixed members 61 to 64, the sub fixing members 52 to 54 come in contact with the sub fixed members 62 to 64 after the main fixing member 51 comes in contact with the main fixed member 61.

Accordingly, the fixing members 51 to 54 are respectively mounted to the corresponding fixed members 61 to 64 from the same direction. When assembling the holder assembly 40, the sub fixing members 52 to 54 are mounted to the sub fixed members 62 to 64 in a state where positioning is achieved by the main fixing member 51 and the main fixed member 61.

Thus, the worker who mounts the holder assembly 40 can mount the holder assembly 40 without considering the order of mounting steps. Consequently, it is possible to inhibit man hour from increasing, and at the same time, it is possible to prevent concentration of load on a particular one of the fixing members 51 to 54 at the time of mounting the holder assembly 40.

In the vehicle seat 1, the dimension L1 of the portion of the opposing wall 55 parallel to the assembling direction is greater than the dimension L2 of the portion of the restriction member 3G parallel to the assembling direction. Since this enables the holder assembly 40 to be reliably guided in the assembling direction when the worker mounts the holder assembly 40 to the sliding device 3, assembly workability is improved.

The electric motor 33 is mounted to the bridge 3C, and the locked members 34 of the harness clamps 45 are disposed on the bridge 3C. Accordingly, interference between the electric motor 33 and the harness clamps 45 can be avoided.

In other words, if the locked members 34 of the harness clamps 45 are disposed on the connector holder 43, the electric motor 33 and the harness clamps 45 may interfere with each other at the time of mounting the holder assembly 40. Such interference between the electric motor 33 and the harness clamps 45 will not happen at the time of mounting the holder assembly 40 in the configuration of the present embodiment.

The main fixed member 61 includes the first guiding protrusion 61A, the second guiding protrusion 61B, and the locking members 61C, 61D. The main fixing member 51 includes the locked members 51A, 51B, the first guide 51C, and the second guide 51D. Accordingly, positioning of the seat-width directions and the up-down directions is achieved when the main fixing member 51 is mounted to the main fixed member 61.

The first sub fixing member 52 is mounted to the first sub fixed member 62 to hold the first sub fixed member 62 from the up-down directions. Accordingly, the first sub fixing member 52 is mounted to the first sub fixed member 62 in a state where the main fixing member 51 is positioned with respect to the main fixed member 61.

The second sub fixing member 53 and the third sub fixing member 54 are respectively mounted to the second sub fixed member 63 and the third sub fixed member 64 to respectively hold the second sub fixed member 63 and the third fixed member 64 from the up-down directions. Accordingly, the sub fixing members 53, 54 are mounted to the sub fixed members 63, 64 in a state where the main fixing member 51 is positioned with respect to the main fixed member 61.

OTHER EMBODIMENTS

In the vehicle seat 1 in the aforementioned embodiment, configuration is made such that the sub fixing members 52 to 54 come in contact with the sub fixed members 62 to 64 after the main fixing member 51 and the main fixed member 61 come in contact with each other when the fixing members 51 to 54 are respectively mounted to the fixed members 61 to 64. Nevertheless, the present disclosure is not limited thereto.

In the aforementioned embodiment, the main fixed member 61 and the first sub fixed member 62 are disposed on the bridge 3C, and the other sub fixed members 63, 64 are disposed on the brackets 3D, 3E that are fixed to the movable rails 3B. Nevertheless, the present disclosure is not limited thereto.

In the vehicle seat 1 in the aforementioned embodiment, the dimension L1 of the portion of the opposing wall 55 parallel to the assembling direction is greater than the dimension L2 of the portion of the restriction member 3G parallel to the assembling direction. Nevertheless, the present disclosure is not limited thereto.

In the aforementioned embodiment, the electric motor 33 is mounted to the bridge 3C, and the locked members 34 of the harness clamps 45 are disposed on the bridge 3C. Nevertheless, the present disclosure is not limited thereto.

In the aforementioned embodiment, the main fixed member 61 includes the first guiding protrusion 61A, the second guiding protrusion 61B, and the locking members 61C, 61D, while the main fixing member 51 includes the locked members 51A, 51B, the first guide 51C, and the second guide 51D. Nevertheless, the present disclosure is not limited thereto.

In the aforementioned embodiment, the first sub fixing member 52 is mounted to the first sub fixed member 62 to hold the first sub fixed member 62 from the up-down directions. Nevertheless, the present disclosure is not limited thereto.

In the aforementioned embodiment, the second sub fixing member 53 and the third sub fixing member 54 are respectively mounted to the second sub fixed member 63 and the third sub fixed member 64 to respectively hold the sub fixed members 63, 64 from the up-down directions. Nevertheless, the present disclosure is not limited thereto.

In the aforementioned embodiment, the vehicle seat of the present disclosure is applied to a car. However, application of the invention disclosed herein is not limited thereto. In other words, the present disclosure may be applied to a seat used in vehicles such as railroad vehicles, ships and boats, and aircrafts, and also to a stationary seat used in theaters and households, for example.

Furthermore, the present disclosure is only required to coincide with the gist of the disclosure described in the aforementioned embodiments and thus should not be limited to the aforementioned embodiments. Therefore, the present disclosure may include a configuration obtained by combining at least two of the aforementioned embodiments, or a configuration obtained by eliminating either one of the elements in the drawings or the elements described with reference numerals in the aforementioned embodiments.

What is claimed is:

1. A vehicle seat mounted to a vehicle, the vehicle seat comprising:

a first sliding device including a first fixed rail configured to be fixed to the vehicle and a first movable rail to which a seat main body is fixed, the first movable rail being slidable relative to the first fixed rail, and the first sliding device being situated on one end side of the seat main body in seat-width directions;

a second sliding device including a second fixed rail configured to be fixed to the vehicle and a second movable rail to which the seat main body is fixed, the second movable rail being slidable relative to the second fixed rail, and the second sliding device being situated on an other end side of the seat main body in the seat-width directions; and a resin connector holder that supports a harness and a connector configured to be coupled to an electrical device and to which the harness and the connector are fixed, the connector holder being directly or indirectly fixed to the first movable rail and the second movable rail, and moves together with the first movable rail and the second movable rail.

2. The vehicle seat according to claim 1, further comprising:

a plurality of fixing members disposed on the connector holder and configured to fix the connector holder to the first movable rail and the second movable rail; and a plurality of fixed members, to each of which corresponding one of the plurality of fixing members is mounted in a direction parallel to a sliding direction of the first movable rail and the second movable rail, wherein, on an assumption that an advancing side of the connector holder in an assembling direction is a front-end side, one of the plurality of fixing members situated closest to the front-end side is a main fixing member, fixing members among the plurality of fixing members other than the main fixing member are collectively called sub fixing members, one of the plurality of fixed members to which the main fixing member is mounted is a main fixed member, and fixed members among the plurality of fixed members to which the sub fixing members are mounted are sub fixed members, the main fixing member, the main fixed member, the sub fixing members and the sub fixed members are configured such that the sub fixing members and the sub fixed members come in contact with each other after the main fixing member and the main fixed member come in contact with each other when the plurality of fixing members are mounted to the plurality of fixed members respectively.

3. The vehicle seat according to claim 2, further comprising:

a bridge extending in the seat-width directions and coupling and bridging the first movable rail and the second movable rail, wherein the main fixed member is disposed on the bridge, and wherein at least one of the sub fixed members is disposed on a bracket that is fixed to at least one of the first movable rail or the second movable rail.

4. The vehicle seat according to claim 3, wherein the bracket includes a wall-shaped restriction member that restricts displacement of the connector holder over a given dimension in the seat-width directions, wherein a portion of the connector holder facing the restriction member includes a wall-shaped opposing wall that is slidably contactable with the restriction member, and wherein a dimension of a portion of the opposing wall parallel to the assembling direction is greater than a dimension of a portion of the restriction member parallel to the assembling direction.

5. The vehicle seat according to claim 4, further comprising:

a harness clamp that holds the harness or the connector, wherein an electric motor is mounted to the bridge, and wherein a mounting part of the harness clamp is disposed on the bridge.

6. The vehicle seat according to claim 5, wherein the main fixed member includes a first guiding protrusion that protrudes towards a receding side of the connector holder in the assembling direction;

a second guiding protrusion that protrudes towards the receding side of the connector holder in the assembling direction, the second guiding protrusion being disposed at a position deviated from the first guiding protrusion in the seat-width directions; and, an elastically displaceable locking member that is disposed between the first guiding protrusion and the second guiding protrusion and is locked to the main fixing member, and wherein the main fixing member includes a locked member to which the locking member is locked;

a first guide that is slidably contactable with the first guiding protrusion in up-down directions and one direction of the seat-width directions; and a second guide that is slidably contactable with the second guiding protrusion in the up-down directions and an other direction of the seat-width directions.

7. The vehicle seat according to claim 3, wherein at least one of the sub fixed members is disposed on the bridge, and wherein at least one of the plurality of fixing members is mounted to the at least one of the sub fixed members disposed on the bridge to hold the at least one of the sub fixed members disposed on the bridge from the up-down directions.

8. The vehicle seat according to claim 3, wherein at least one of the plurality of fixing members is mounted to the at least one of the sub fixed members disposed on the bracket to hold the at least one of the sub fixed members disposed on the bracket from the up-down directions.

9. A method of assembling a vehicle seat mounted to a vehicle, the vehicle seat comprising:

a first sliding device including a first fixed rail that is fixed to the vehicle and a first movable rail to which a seat main body is fixed, the first movable rail being slidable relative to the first fixed rail, and the first sliding device being situated on one end side of the seat main body in seat-width directions;

a second sliding device including a second fixed rail that is fixed to the vehicle and a second movable rail to which the seat main body is fixed, the second movable rail being slidable relative to the second fixed rail, and the second sliding device being situated on an other side of the seat main body in the seat-width directions;

a resin connector holder that supports a harness and a connector coupled to an electrical device and to which the harness and the connector are fixed, the connector holder being directly or indirectly fixed to the first movable rail and the second movable rail, and moves together with the first movable rail and the second movable rail; and a plurality of fixing members disposed on the connector holder, the plurality of fixing members fixing the connector holder to the first movable rail and the second movable rail; and a plurality of fixed members, to each of which corresponding one of the plurality of fixing members is mounted in a direction parallel to a sliding direction of the first movable rail and the second movable rail, wherein, on an assumption that an advancing side of the connector holder in an assembling direction is a front-end side, one of the plurality of fixing members situated closest to the front-end side is a main fixing member, fixing members among the plurality of fixing members other than the main fixing member are collectively called sub fixing members, one of the plurality of fixed members to which the main fixing member is mounted is a main fixed member, and fixed members among the plurality of fixed members to which the sub fixing members are mounted are sub fixed members, the connector holder is assembled such that the sub fixing members and the sub fixed members come in contact with each other after the main fixing member and the main fixed member come in contact with each other when the plurality of fixing members are mounted to the plurality of fixed members respectively.

* * * * *